Dec. 29, 1942.    W. N. TRAYLOR ET AL    2,306,651
PROCESS FOR PRODUCING POLYMERIZED ROSIN
Filed April 10, 1940
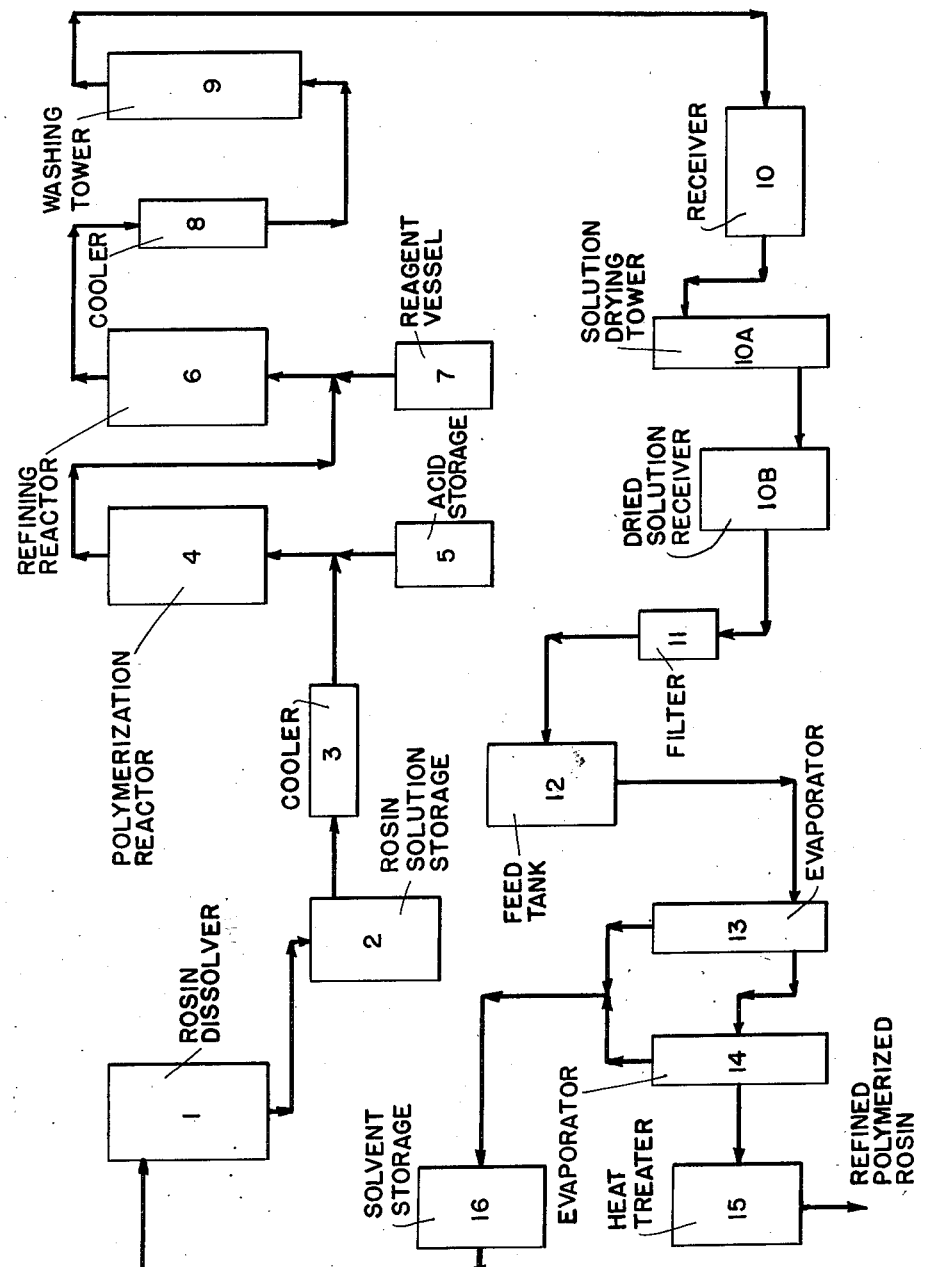
WILLIAM N. TRAYLOR
CLELL E. TYLER
INVENTOR.
BY Cleveland B. Hallabaugh.

Patented Dec. 29, 1942

2,306,651

UNITED STATES PATENT OFFICE 2,306,651

PROCESS FOR PRODUCING POLYMERIZED ROSIN

William N. Traylor and Clell E. Tyler, Hattiesburg, Miss., assignors to Hercules Powder Company, Wilmington, Del., a corporation of Delaware Application April 10, 1940, Serial No. 328,866

14 Claims. (Cl. 260—97)

This invention relates to an improved method for the production of polymerized rosin of pale color, and more particularly relates to a continuous process for the manufacture of refined polymerized rosin.

Heretofore rosin has been polymerized with sulfuric acid, for example, by treating the rosin dissolved in a suitable solvent with sulfuric acid. When rosin is treated with sulfuric acid under polymerizing conditions a dark-colored acid sludge is invariably formed, consisting presumably of an association product of the polymerized rosin and sulfuric acid. This sludge usually separates out from the solution during the polymerization process, being insoluble in the rosin solution. It has been the practice to recover the polymerized rosin by either of two procedures. In one procedure the reaction mixture has been washed with water to remove the sulfuric acid and to effect the decomposition of the acid sludge. Any rosin contained in the acid sludge is then redissolved in the solvent. The polymerized rosin has then been recovered from its solution by evaporation of the solvent. From such a procedure a polymerized rosin of much darker color than the original rosin is obtained. By another procedure, the acid sludge has been allowed to separate from the rosin solution and the polymerized rosin recovered by evaporation of the solvent. According to this latter procedure, the yield of polymerized rosin is quite low.

The color of the polymerized rosin obtained by any of the known procedures, such as those defined above, has been too dark for many of the uses of polymerized rosin. It has, therefore, been necessary to subject the polymerized rosin to a refining treatment to improve its color. The known procedures for refining rosin have heretofore proved unsatisfactory since they do not satisfactorily improve the color and since they exhibit a definite tendency to decrease the melting point of the polymerized rosin, thereby defeating the original purpose of the polymerizing treatment. Furthermore, a decrease in yield is generally encountered. Also, in any procedure heretofore known for refining polymerized rosin it has been necessary to evaporate the solvent from the polymerized rosin solution and later redissolve the polymerized rosin in a solvent, usually a different solvent, in an effort to obtain a refining of the polymerized rosin. Even after such a laborious operation satisfactory refined polymerized rosin has not been obtained, or if a pale polymerized rosin has been obtained an appreciable sacrifice in yield has been necessary.

It is an object of this invention to provide an improved process for producing refined polymerized rosin.

It is a further object to provide a continuous process for producing refined polymerized rosin which is extremely simple and economical.

It is a still further object to provide a continuous process for producing refined polymerized rosin from rosin in one continuous operation which provides a refined polymerized rosin in a substantially quantitative yield based on the rosin treated.

It is another object to provide a continuous process for producing refined polymerized rosin from rosin which eliminates the separation of an unrefined polymerized rosin and also eliminates the steps of washing the polymerized rosin solution prior to refining and evaporation of the solvent from the solution prior to refining.

Other objects of the invention will appear hereinafter.

The above objects may be accomplished in accordance with this invention by continuously contacting a rosin solution with a polymerization catalyst comprising the acid sludge which is formed when rosin is treated with sulfuric acid under polymerizing conditions to effect polymerization of the rosin, removing polymerized rosin solution continuously from the polymerizing vessel and then subjecting the polymerized rosin solution continuously to the action of nascent hydrogen. Washing of the refined polymerized rosin solution followed by removal of the solvent provides the refined polymerized rosin.

The attached flow-sheet drawing illustrates a schematic plan for carrying out the process.

The rosin treated by the method in accordance with this invention may be any of the various grades of wood or gum rosin. It may have been previously heat-treated, distilled or refined by any of the processes known to the art. When treating wood rosin, a rosin is preferred which has been subjected previously to a refining operation for the removal of color bodies, although unrefined wood rosin may be treated according to this process. Any of the usual grades of gum rosin are well adapted for the treatment. Rosin which has been heat-treated prior to polymerization will, in general, give a polymerized rosin of higher melting point than the corresponding rosin not heat-treated.

The concentration of rosin in the solution used in the process may vary over the range of about 10% to about 60% by weight and preferably will be within the range of about 20% to about 40% by weight. Among the solvents for rosin which may be used are coal tar hydrocarbons, such as, for example, benzol, toluol, xylol; petroleum hydrocarbons, as, for example, pentane, hexane, heptane and various gasoline fractions such as those boiling within the range from about 90° C. to about 175° C.; hydrogenated petroleum solvents, such as those known under the trade name of "Solvesso"; carbon tetrachloride, cyclohexane, paramenthane, etc. Of these solvents benzol and the gasoline fractions are preferred.

The acid sludge which is employed as a polymerization catalyst is prepared by treating rosin dissolved in a suitable solvent with sulfuric acid of suitable strength under polymerizing conditions and is the incompatible layer which separates from the rosin solution. We believe the sludge contains an association product of polymerized rosin and sulfuric acid which acts as the effective catalytic material. The sulfuric acid used in preparing the acid sludge catalyst may vary within the range of about 65% to about 102% and preferably will be within the range of about 85% to about 100%. The amount of sulfuric acid used may be within the range of about 5% to about 200% by weight of the rosin and preferably will be within the range of about 25% to about 50% by weight based on the rosin.

We have found that the acid sludge catalyst does not increase perceptibly in amount as rosin is brought into contact with it. It, therefore, appears that the acid sludge exerts a definite polymerizing effect on the rosin. The rosin solution carries approximately 0.5 to 1 per cent, based on its weight, of sulfuric acid out of the acid sludge catalyst. It is desirable to add a small amount of sulfuric acid to the acid sludge catalyst from time to time to compensate for this loss. It will be appreciated that the small amount of sulfuric acid added in this manner merely replaces the sulfuric acid lost from the acid sludge by entrainment and serves to maintain the acidity of the acid sludge catalyst at approximately its original strength. When the catalyst becomes reduced in catalytic activity, it may be replaced with a fresh acid sludge with little difficulty. When the acid sludge catalyst is removed from the polymerization vessel and is replaced by the fresh catalyst a small amount of rosin is carried along with the sludge. This loss constitutes the only loss of rosin in the polymerization step of the process and is usually well below 5% of the total rosin treated. It may be recovered from the catalyst, if desired.

The temperature at which the polymerizing reaction is carried out may vary from about —10° C. to about 65° C., and preferably will fall within the range of about 0° C. to about 25° C. Above about 25° C. side reactions occur which tend to darken the rosin, while at temperatures below about 0° C., long reaction periods are necessary to produce an appreciable increase in the melting point of the rosin.

The nascent hydrogen for use in the refining step of the process in accordance with this invention may be provided by the reaction of an acid reactant with a metal above hydrogen in the electromotive series. The acid reactant may be either an acid or an acid salt or a mixture thereof. Among the acid reactants which may be used are, for example, sulfuric acid, phosphoric acid, acetic acid, sodium acid sulfate, mono sodium acid phosphate, disodium acid phosphate, mono potassium acid phosphate, dipotassium acid phosphate, calcium acid phosphate, lithium acid phosphate, etc. Any of the metals above hydrogen in the electromotive series may be employed. It will be preferable, however, to use metals which form salts having no appreciable discoloring action on the polymerized rosin. Metals will be employed preferably, though not necessarily, in a finely divided form. Use of metals such as, for example, cadmium, aluminum, manganese, tin and zinc is desirable. Zinc in the form of zinc dust, mossy zinc or zinc powder is particularly well adapted to the process. It will be desirable that at least a small amount of water or some other ionizing solvent be present to accelerate the refining action. Use of an acid or of the hydrate of an acid salt will provide the desired ionizing effect.

It will be understood that the acid reactant and the metal are both in contact with the polymerized rosin solution during the treatment. It is desirable to employ vigorous agitation in carrying out the refining step of the process to obtain thorough contact with the acid reactant and metal to accelerate the refining action.

The speed with which the polymerized rosin becomes refined is also dependent on the temperature employed in the treatment. While the treatment may be carried out at room temperature, the rate of refining is rather slow for practical purposes. It is preferable to carry out the treatment at elevated temperatures and temperatures as high as 140° C. have been found to be satisfactory, although higher temperatures are possible. A temperature within the range of about 70° C. to about 125° C. is preferable. It is convenient to carry out the refining step at the reflux temperature of the solvent being used. Where the treatment is to be carried out above the normal boiling point of the solvent, use of superatmospheric pressure is resorted to. The treatment may be carried out at less than atmospheric pressure if desired. Pressures employed are in no way limiting on the process and the equipment will generally determine the maximum pressure which is practical.

The time of treatment of the polymerized rosin in the refining step of the process may be varied to provide the result desired. The time necessary to provide satisfactory refining of the polymerized rosin will be dependent on such factors as the amount of color bodies present in the polymerized rosin, the temperature of treatment, the amount of nascent hydrogen utilized, etc. For this reason it is impossible to state any definite time necessary, except in relation to a given set of conditions. The detailed description and the examples of the process which follow will serve to illustrate the time of treatment which may be used in any particular case.

The amount of acid reactant used in the refining step for producing nascent hydrogen may vary over a wide range depending on such factors as the particular acid reactant used, the degree of refining desired, the particular conditions of treatment, as well as other factors. Assuming the acid reactant to be on an anhydrous basis, ratios of polymerized rosin to acid reactant as high as 40 to 1 on a weight basis have been used. In general, however, ratios between 10 of polymerized rosin to 1 of acid reactant down to 1 of polymerized rosin to 1 or more of acid reactant are desirable. The preferred ratio is approximately 2 of polymerized rosin to 1 of acid reactant.

The concentration of the acid reactant, i. e., in terms of an aqueous solution thereof, may also be varied. With sulfuric acid as the acid reactant, for example, aqueous solutions thereof varying in strength from about 3% to about 95% sulfuric acid may be used, but in general aqueous solutions of sulfuric acid varying from about 3% to about 50% will be preferable. With sodium acid sulfate, for example, a hydrate such as the monohydrate or an aqueous solution containing about 10% of sodium acid sulfate up to a saturated solution thereof may be used. When carrying out the treatment at elevated temperatures and under superatmospheric pressure the concentration of the acid reactant used may be about the same, although in general it will be found that more dilute solutions may be used.

The amount of metal above hydrogen in the electromotive series which is employed is not particularly critical. It will be preferable, however, to have an amount of such metal present which will be an excess over the theoretical amount required to react with the acid reactant present.

The process of the invention will be described in greater detail in reference to the flow-sheet drawing. Referring to the drawing, there is shown a flow-sheet illustrating diagrammatically a plan for carrying out the process of this invention.

The rosin is first dissolved in the dissolver vessel 1, from which the rosin solution is led into vessel 2 where it is stored. From vessel 2 the rosin solution is passed through a jacketed cooler 3 to bring the solution to the temperature desired in the polymerization step of the process. A properly proportioned amount of the rosin solution is then flowed or pumped from the storage vessel 2 through the cooler 3 and into the polymerization reactor 4 equipped with suitable agitating means and also jacketed to permit circulation of a cooling medium through the jacket. Sulfuric acid of 65 to 102% strength in amount within the range of 5–200% of the rosin and preferably 25–50% of the rosin is then flowed or pumped into the polymerization reactor 4 from the acid storage vessel 5. The combined rosin solution and sulfuric acid in the polymerization reactor need not necessarily fill the reactor at this stage. The rosin solution and sulfuric acid are then agitated at a temperature within the range of $-10°$ C. to 65° C. and preferably within the range of 0° C. to 25° C. for a period of time to polymerize the rosin. As a result of the polymerization the acid sludge separates as a subnatant layer, it being of considerably higher density than the rosin solution and being incompatible therewith. This initial polymerization of the rosin to produce the acid sludge catalyst may be carried out for a period of time varying between about ½ hour to about 1½ hours, depending on the degree of polymerization required.

The continuous flow of rosin solution from the storage vessel 2 through cooler 3 into the polymerization reactor 4 is then commenced at a definite rate. The rosin preferably enters the bottom of the polymerization reactor and thus comes into intimate contact with the acid sludge catalyst. Intimate contact of the rosin solution with the acid sludge catalyst is provided by agitation. The agitation is preferably of such a nature as to permit separation of a layer of polymerized rosin solution at the top of the reactor. A continuous flow of polymerized rosin solution then issues from the top of the polymerization reactor at a rate equal to the rate at which the rosin solution is delivered to the bottom of the polymerization reactor. The rate of delivery of the rosin solution to the polymerization reactor will determine the time of contact with the acid sludge catalyst and will consequently control the degree of polymerization obtained. The flow of rosin solution to the polymerization reactor is continuous and need only be interrupted when the activity of the acid sludge catalyst diminishes and replacement is desirable. To avoid even this interruption a second reserve polymerization reactor containing fresh acid sludge catalyst may be used when activity of the first catalyst diminishes and the flow of rosin solution transferred to it. The polymerized rosin solution flowing from the top of the polymerization reactor entrains a small amount of sulfuric acid from the acid sludge. The rosin solution thus carries approximately 0.5 to 1 per cent based on its weight of sulfuric acid out of the acid polymerization reactor. This loss may be compensated by the periodic addition of a corresponding amount of sulfuric acid to the reactor from the sulfuric acid storage vessel 5.

From the top of the polymerization reactor the polymerized rosin solution containing a small amount of sulfuric acid flows to the refining reactor 6. In commencing the refining step of the process the refining reactor 6 is first partially filled with the polymerized rosin solution. The metal above hydrogen in the electromotive series, preferably in a finely divided form, and the acid reactant in any of the forms described above are then added to the refining reactor, the latter from reagent vessel 7. The refining reactor is heated at the temperature at which it is desired to carry out the refining step of the process, such as described above. Alternatively an intermediate heat exchanger may be inserted between the polymerization reactor 4 and the refining reactor 6 to heat the rosin solution prior to its entry into the refining reactor. The polymerized rosin solution, the acid reactant and the metal are agitated vigorously in the refining reactor for a period of time depending on the degree of refining desired. The agitation and construction of the refining reactor are such as to permit separation of the polymerized rosin solution at the top of the reactor so that the excess acid reactant and metal will remain in the refining reactor except for the small amounts carried over by entrainment in the polymerized rosin solution. The flow of polymerized rosin solution into the refining reactor 6 from the polymerization reactor 4 is at the same rate at which rosin solution enters the polymerization reactor 4 and thus reactors 4 and 6 are kept synchronized.

It will be necessary from time to time to replenish the acid reactant and the metal in the refining reactor. It has been found advantageous to empty the refining reactor of all aqueous reagents at intervals of from 12 to 30 hours, and wash the reactor thoroughly with water. This operation may be carried out conveniently without interrupting the continuous flow of rosin solution by use of a reserve refining reactor and transferring the flow to it during the interval of cleaning the first refining reactor.

The refined polymerized rosin solution flows out of the top of the refining reactor 6 through cooler 8 and then enters washing tower 9, where any acidic and water-soluble constituents are removed. From tower 9, the polymerized rosin solution passes to receiver 10 and then through a solution drying tower 10A and into a dried solution receiver 10B from which it proceeds to filter 11. Alternatively, the polymerized rosin solution may be transferred from receiver 10 directly to filter 11. Any insoluble particles are removed in the filter 11 and the refined polymerized rosin solution is then delivered into an evaporator feed tank 12 from which it is delivered to continuous evaporators 13 and 14 where the solvent is removed continuously from the solution. The refined polymerized rosin is delivered from the evaporators to containers and the solvent passes on to the solvent storage tank 16. Alternatively, the refined polymerized rosin may pass from the evaporators to a heat-treating vessel 15 and from the latter vessel to the final container. For some uses of the polymerized rosin it is desirable to subject it to a heat-treatment at, for example, a temperature of about 250° C. in order to remove the small amount of volatile sulfur compounds contained therein, since the presence of sulfur compounds is undesirable in some of the uses of the refined polymerized rosin. This step, however, is not necessary and will be used only when it is desired to remove the volatile sulfur compounds.

A more detailed description of the process of the invention will be given in the following example, illustrating a specific mode of carrying out the process:

K wood rosin is dissolved in benzol in dissolving vessel 1 to give a solution having a concentration of 30 to 33% by weight. This solution is then dropped into the storage tank 2. About 65–70 gallons of this rosin solution are then pumped from the storage vessel 2 through the pre-cooler 3 and into a polymerization reactor 4 of 85 gallons capacity with the temperature of the rosin solution in the reactor at 15–17° C. The agitator is set in motion and sulfuric acid of 95–98% concentration is then added to the rosin solution in 5-pound portions until a total of 45 pounds has been added, the temperature being kept below 20° C. throughout the addition. The addition of sulfuric acid usually requires about 30 to about 50 minutes. The rosin solution is agitated with the acid sludge catalyst for an additional period of about 50 minutes to provide the desired degree of polymerization. The continuous flow of rosin solution is then commenced from the storage vessel 2 through pre-cooler 3 and into the bottom of the polymerization reactor at the rate of approximately 0.45 to 0.65 gallon per minute. This rate represents a rosin input of from 62 to 85 pounds per hour. From this point on, the polymerization is continuous. When the polymerization reactor 4 becomes filled due to the flow of rosin solution into the bottom, the flow of polymerized rosin solution from the top of the reactor and into the refining reactor 6 commences. As stated above, the agitation in the polymerization reactor is of such a nature as to provide separation of the polymerized rosin solution from the acid sludge in the upper part of the polymerization vessel. After the continuous flow of rosin solution to the polymerization reactor is started, approximately 2 to 4 pounds of 95–98% sulfuric acid are added to the reactor approximately each 30 minutes in order to compensate for the 0.5 to 1% of sulfuric acid carried out of the polymerization reactor by the stream of polymerized rosin solution. The flow of polymerized rosin solution from the polymerization reactor enters the refining reactor 6. With a refining reactor of 100 gallons capacity, about 20 to 25 pounds of zinc dust, about 120 pounds of a 20–25% by weight aqueous solution of sodium acid sulfate and about 30 pounds of 25–30% by weight sulfuric acid solution are first added to about 65 to 80 gallons of polymerized rosin solution. The refining reactor is heated to a temperature of about 88–94° C. and the contents agitated. The pressure in the reactor is approximately 20 pounds per square inch at this temperature range. After allowing about 30 minutes preliminary contact time in the refining reactor 6 at this temperature, the flow of polymerized rosin solution into the refining reactor 6 is kept up at the same rate as the solution of rosin is being fed into the polymerization reactor 4. The agitation provided in the refining reactor and its construction permit separation of the refined polymerized rosin solution from the acid reactant and metal in the upper part of the reactor, so that excess acid reactant and metal remain in the reactor while the refined polymerized rosin solution flows out of the top of the reactor. Approximately 2 to 3 pounds of zinc dust and 10 to 20 pounds of 20% sulfuric acid solution are added to the refining reactor each hour in order to provide sufficient acid reactant and metal for the refining treatment.

The continuous flow of refined polymerized rosin solution leaves the top of the refining reactor 6 through the cooler 8 and then enters the washing tower 9 where any water-soluble acid and salt are removed. The washed solution passes into receiver 10 and then into solution drying tower 10A and into the storage vessel 10B from which it is delivered into filter 11. From the filter the filtered solution is delivered into the evaporator feed tank 12 and is continuously fed into the evaporators 13 and 14 from which the solvent is delivered to the solvent storage vessel 16 and the polymerized rosin is delivered to heat-treater 15.

In the heat-treating vessel 15 the refined polymerized rosin is heated continuously at a temperature of about 250° C. for approximately 10 minutes while steam is blown into the refined polymerized rosin. This treatment removes the volatile sulfur compounds and renders the refined polymerized rosin suitable for all uses including those in which a small contamination of sulfur is undesirable. The average analysis of the refined polymerized rosin obtained in the above continuous treatment while operating under the stated conditions is as follows:

Acid number_____ 151–155
Color_____ 14–26 Amber (Lovibond)
Grade_____ X to WG
Melting point_____ 98–101° C.
Color with 2% lead resinate_____ 25–40 Amber Thus, as a result of the above continuous process of producing refined polymerized rosin from rosin a product is obtained having approximately a 20 degree higher melting point and a color approximately 2–3 grades lighter than the original rosin. K wood rosin has an average melting point of about 81° C. and an average color of about 40 Amber+1.5 Red. The yield is above 95 per cent on the basis of the rosin treated and, therefore, is considered to be substantially quantitative.

The continuous operation described in the above specific example need only be interrupted when it is desirable to replace the acid sludge in the polymerization reactor or to wash out the refining reactor, as described above. Even these interruptions may be avoided by use of a reserve polymerization reactor and a reserve refining reactor. A small amount of the acid sludge catalyst may be withdrawn from the polymerization reactor at periodic intervals such as, for example, once every eight hours, and replaced by fresh sulfuric acid.

While the above specific example provides a refined polymerized rosin having a melting point of 98-101° C., it will be apparent that the procedure may be varied so as to provide polymerized rosin of a lower or higher melting point than 98-101° C. Thus, by increasing or decreasing the time of contact of the rosin solution with the acid sludge catalyst in the polymerization reactor, an increase or a decrease in the melting point of the refined polymerized rosin over that obtained in the above specific example may be provided. Also, it will be apparent that by suitable modification of the refining operation, such as to provide a longer contact of the polymerized rosin solution with the nascent hydrogen, a color lighter than that obtained in the above specific example may be provided.

The advantages of the improved process of polymerizing rosin to obtain refined polymerized rosin described in accordance with this invention will be readily apparent from the above disclosure. Thus,, the process is particularly advantageous both from an economical and a technical standpoint as it makes it possible to produce a refined polymerized rosin in a fewer number of steps than has hitherto been possible by any of the known methods of obtaining a polymerized rosin of pale color. Thus, it has been necessary previously in polymerizing rosin with sulfuric acid to remove the residual acid contained in the solution by washing with water. This operation has been difficult due to the formation of an emulsion which made the washing operation a very difficult task from a technical or engineering standpoint. Also, after removal of the acid by washing it was previously necessary to remove solvents in order to recover the polymerized rosin. The polymerized rosin obtained was usually no lighter in color than the original rosin treated and was generally darker. Thus for many of the uses of polymerized rosin it was necessary to further refine the product. This usually necessitated re-dissolving the polymerized rosin in a suitable solvent. All of these steps require extra handling of the polymerized rosin and only result in a lowering of the yield and an increase of the process time.

All of these disadvantages are clearly overcome by the present continuous procedure of polymerizing rosin and then refining the polymerized rosin in one continuous operation. As described above, it is unnecessary in this continuous process to remove the small amount of sulfuric acid carried over from the polymerization reactor by the polymerized rosin solution. In fact, this residual sulfuric acid aids in the generation of nascent hydrogen in the subsequent refining step of the operation. Furthermore, this process provides a polymerized rosin in a substantially quantitative yield based on the rosin treated. Thus from an economic standpoint the operation is very favorable.

While the above description and example together with the flow-sheet for carrying out the operation in accordance with this invention are shown merely by way of illustration, it will be apparent that any modification of these in which the steps of the process are capable of being carried out may be used. As a modification in the refining step of my above-described process, for example, the nascent hydrogen may be provided by electrolysis. By such a modification the polymerized rosin solution may be passed through an electrolytic cell containing an acid solution or an aqueous salt solution while a direct current is passed through the cell. The length of contact of the rosin solution in the cell and the current passed through the cell will determine the degree of refining obtained.

What I claim and desire to protect by Letters Patent is:

1. A continuous process for producing refined polymerized rosin which includes contacting rosin dissolved in a suitable solvent at a temperature within the range of about −10° C. to about 65° C. with a separately prepared catalyst comprising the acid sludge formed by treatment of rosin with sulfuric acid under conditions of reaction adapted to effect polymerization of the rosin, said rosin solvent having substantially no solvent action on the said acid sludge, separating polymerized rosin solution from said catalyst continuously, and treating said polymerized rosin solution which contains residual acid from the polymerization catalyst continuously with nascent hydrogen in the presence of an acidic reactant containing ionizable hydrogen and in the presence of at least a small amount of water.

2. A continuous process for producing refined polymerized rosin which includes contacting rosin dissolved in a suitable solvent at a temperature within the range of about −10° C. to about 65° C. with a separately prepared catalyst comprising the acid sludge formed by treatment of rosin with sulfuric acid of a concentration within the range of about 65% to about 102% and in an amount within the range of about 5% to about 200% by weight of the rosin under conditions of reaction adapted to effect polymerization of the rosin, said rosin solvent having substantially no solvent action on the said acid sludge, separating polymerized rosin solution from said catalyst continuously, treating said polymerized rosin solution which contains residual acid from the polymerization catalyst continuously with nascent hydrogen in the presence of an acidic reactant containing ionizable hydrogen and in the presence of at least a small amount of water, and evaporating the solvent from the solution to recover refined polymerized rosin.

3. A continuous process for producing refined polymerized rosin which includes contacting rosin dissolved in a suitable solvent at a temperature within the range of about −10° C. to about 65° C. with a separately prepared catalyst comprising the acid sludge formed by treatment of rosin with sulfuric acid of a concentration within the range of about 85% to about 100% and in an amount within the range of about 25% to about 50% by weight of the rosin under conditions of reaction adapted to effect polymerization of the rosin, said rosin solvent having substantially no solvent action on the said acid sludge, separating polymerized rosin solution from said catalyst continuously, treating said polymerized rosin solution which contains residual acid from the polymerization catalyst continuously with nascent hydrogen in the presence of an acidic reactant containing ionizable hydrogen and in the presence of at least a small amount of water, and evaporating the solvent from the solution to recover refined polymerized rosin.

4. A continuous process for producing refined polymerized rosin which includes contacting a solution of rosin in a suitable solvent containing about 10% to about 60% by weight of rosin at a temperature within the range of about −10° C. to about 65° C. with a separately prepared catalyst comprising the acid sludge formed by treatment of rosin with sulfuric acid of a concentration within the range of about 85% to about 100% and in an amount within the range of about 25% to about 50% by weight of the rosin under conditions of reaction adapted to effect polymerization of the rosin, said rosin solvent having substantially no solvent action on the said acid sludge separating polymerized rosin solution from said catalyst continuously, treating said polymerized rosin solution which contains residual acid from the polymerization catalyst continuously with nascent hydrogen in the presence of an acidic reactant containing ionizable hydrogen and in the presence of at least a small amount of water, and evaporating the solvent from the solution to recover refined polymerized rosin.

5. A continuous process for producing refined polymerized rosin which includes contacting rosin dissolved in a suitable solvent at a temperature within the range of about −10° C. to about 65° C. with a separately prepared catalyst comprising the acid sludge formed by treatment of rosin with sulfuric acid under conditions of reaction adapted to effect polymerization of the rosin, said rosin solvent having substantially no solvent action on the said acid sludge, separating polymerized rosin solution from said catalyst continuously, treating said polymerized rosin solution which contains residual acid from the polymerization catalyst continuously with nascent hydrogen in the presence of an acidic reactant containing ionizable hydrogen and in the presence of at least a small amount of water, washing the treated solution to remove water-soluble materials and evaporating the solvent from the solution to recover refined polymerized rosin.

6. A continuous process for producing refined polymerized rosin which includes contacting rosin dissolved in a suitable solvent at a temperature within the range of about −10° C. to about 65° C. with a separately prepared catalyst comprising the acid sludge formed by treatment of rosin with sulfuric acid under conditions of reaction adapted to effect polymerization of the rosin, said rosin solvent having substantially no solvent action on the said acid sludge, separating polymerized rosin solution from said catalyst continuously, treating said polymerized rosin solution which contains residual acid from the polymerization catalyst continuously with nascent hydrogen formed by the reaction of an acidic reactant containing ionizable hydrogen and a metal above hydrogen in the electromotive series in contact with said polymerized rosin solution and in the presence of at least a small amount of water, washing the treated solution to remove water-soluble materials and evaporating the solvent from the solution to recover refined polymerized rosin.

7. A continuous process for producing refined polymerized rosin which includes contacting rosin dissolved in a suitable solvent at a temperature within the range of about −10° C. to about 65° C. with a separately prepared catalyst comprising the acid sludge formed by treatment of rosin with sulfuric acid under conditions of reaction adapted to effect polymerization of the rosin, said rosin solvent having substantially no solvent action on the said acid sludge, separating polymerized rosin solution from said catalyst continuously, treating said polymerized rosin solution which contains residual acid from the polymerization catalyst continuously with nascent hydrogen formed by the reaction of an acidic reactant containing ionizable hydrogen and a metal above hydrogen in the electromotive series in contact with said polymerized rosin solution and in the presence of at least a small amount of water, washing the treated solution to remove water-soluble materials, and subjecting the refined polymerized rosin to a heat treatment at an elevated temperature to remove volatile sulfur compounds.

8. A continuous process for producing refined polymerized rosin which includes contacting rosin dissolved in a suitable solvent at a temperature within the range of about −10° C. to about 65° C. with a separately prepared catalyst comprising the acid sludge formed by treatment of rosin with sulfuric acid under conditions of reaction adapted to effect polymerization of the rosin, said rosin solvent having substantially no solvent action on the said acid sludge, separating polymerized rosin solution from said catalyst continuously, treating said polymerized rosin solution which contains residual acid from the polymerization catalyst continuously with nascent hydrogen formed by the reaction of an acid and a metal above hydrogen in the electromotive series in contact with said polymerized rosin solution and in the presence of at least a small amount of water, washing the treated solution to remove water-soluble materials and evaporating the solvent from the solution to recover refined polymerized rosin.

9. A continuous process for producing refined polymerized rosin which includes contacting rosin dissolved in a suitable solvent at a temperature within the range of about −10° C. to about 65° C. with a separately prepared catalyst comprising the acid sludge formed by treatment of rosin with sulfuric acid under conditions of reaction adapted to effect polymerization of the rosin, said rosin solvent having substantially no solvent action on the said acid sludge, separating polymerized rosin solution from said catalyst continuously, treating said polymerized rosin solution which contains residual acid from the polymerization catalyst continuously with nascent hydrogen formed by the reaction of an acid salt and a metal above hydrogen in the electromotive series in contact with said polymerized rosin solution and in the presence of at least a small amount of water, washing the treated solution to remove water-soluble materials and evaporating the solvent from the solution to recover refined polymerized rosin.

10. A continuous process for producing refined polymerized rosin which includes contacting rosin dissolved in a suitable solvent at a temperature within the range of about −10° C. to about 65° C. with a separately prepared catalyst comprising the acid sludge formed by treatment of rosin with sulfuric acid under conditions of reaction adapted to effect polymerization of the rosin, said rosin solvent having substantially no solvent action on the said acid sludge, separating polymerized rosin solution from said catalyst continuously, treating said polymerized rosin solution which contains residual acid from the polymerization catalyst continuously with nascent hydrogen formed by the reaction of sulfuric acid and a metal above hydrogen in the electromotive series in contact with said polymerized rosin solution and in the presence of at least a small amount of water, washing the treated solution to remove water-soluble materials and evaporating the solvent from the solution to recover refined polymerized rosin.

11. A continuous process for producing refined polymerized rosin which includes contacting rosin dissolved in a suitable solvent at a temperature within the range of about −10° C. to about 65° C. with a separately prepared catalyst comprising the acid sludge formed by treatment of rosin with sulfuric acid under conditions of reaction adapted to effect polymerization of the rosin, said rosin solvent having substantially no solvent action on the said acid sludge, separating polymerized rosin solution from said catalyst continuously, treating said polymerized rosin solution which contains residual acid from the polymerization catalyst continuously with nascent hydrogen formed by the reaction of sodium acid sulfate and zinc in contact with said polymerized rosin solution and in the presence of at least a small amount of water, washing the treated solution to remove water-soluble materials and evaporating the solvent from the solution to recover refined polymerized rosin.

12. A continuous process for producing refined polymerized rosin which includes contacting rosin dissolved in a suitable solvent at a temperature within the range of about −10° C. to about 65° C. with a separately prepared catalyst comprising the acid sludge formed by treatment of rosin with sulfuric acid under conditions of reaction adapted to effect polymerization of the rosin, said rosin solvent having substantially no solvent action on the said acid sludge, separating polymerized rosin solution from said catalyst continuously, treating said polymerized rosin solution which contains residual acid from the polymerization catalyst continuously with nascent hydrogen formed by the reaction of sodium acid sulfate monohydrate and zinc in contact with said polymerized rosin solution and in the presence of at least a small amount of water, washing the treated solution to remove water-soluble materials and evaporating the solvent from the solution to recover refined polymerized rosin.

13. A continuous process for producing refined polymerized rosin which includes contacting rosin dissolved in a suitable solvent at a temperature within the range of about −10° C. to about 65° C. with a separately prepared catalyst comprising the acid sludge formed by treatment of rosin with sulfuric acid under conditions of reaction adapted to effect polymerization of the rosin, said rosin solvent having substantially no solvent action on the said acid sludge, separating polymerized rosin solution from said catalyst continuously, treating said polymerized rosin solution which contains residual acid from the polymerization catalyst continuously with nascent hydrogen formed by the reaction of an aqueous solution of sodium acid sulfate and zinc in contact with said polymerized rosin solution, washing the treated solution to remove water-soluble materials and evaporating the solvent from the solution to recover refined polymerized rosin.

14. A continuous process for producing refined polymerized rosin which includes contacting a solution of rosin in a suitable solvent containing about 20 per cent to about 40 per cent by weight of rosin at a temperature within the range of about 0° C. to about 25° C. with a separately prepared catalyst comprising the acid sludge formed by treatment of rosin with sulfuric acid of a concentration within the range of about 85 per cent to about 100 per cent and in an amount within the range of about 25 per cent to about 50 per cent by weight of the rosin under conditions of reaction adapted to effect polymerization of the rosin, said rosin solvent having substantially no solvent action on the said acid sludge, separating polymerized rosin solution from said catalyst continuously, treating said polymerized rosin solution which contains residual acid from the polymerization catalyst continuously with nascent hydrogen formed by the reaction of an acidic reactant containing ionizable hydrogen and a metal above hydrogen in the electromotive series and in the presence of at least a small amount of water, washing the said solution to remove water-soluble materials and evaporating the solvent from the said solution to recover refined polymerized rosin in a substantially quantitative yield based on the rosin treated.

WILLIAM N. TRAYLOR.
CLELL E. TYLER.